TAPE RECORDER TRANSPORT

Filed July 18, 1962 4 Sheets-Sheet 1

INVENTORS:
Stanley Berger
Leonard Rosenblatt
BY Maxwell E. Sparrow
ATTORNEY.

March 10, 1964 S. BERGER ETAL 3,124,318

TAPE RECORDER TRANSPORT

Filed July 18, 1962 4 Sheets-Sheet 2

INVENTORS.
Stanley Berger
Leonard Rosenblatt
BY
Maxwell E. Sparrow
ATTORNEY.

TAPE RECORDER TRANSPORT

Filed July 18, 1962 4 Sheets-Sheet 3

INVENTOR.
Stanley Berger
Leonard Rosenblatt
BY Maxwell E. Sparrow.
ATTORNEY.

TAPE RECORDER TRANSPORT

Filed July 18, 1962 4 Sheets-Sheet 4

INVENTOR.
Stanley Berger
Leonard Rosenblatt
BY
Maxwell E. Sparrow
ATTORNEY.

United States Patent Office 3,124,318
Patented Mar. 10, 1964

3,124,318

TAPE RECORDER TRANSPORT

Stanley Berger and Leonard Rosenblatt, Brooklyn, N.Y., assignors to Auricord Corporation, Brooklyn, N.Y.

Filed July 18, 1962, Ser. No. 210,764
8 Claims. (Cl. 242—55.12)

This invention relates to tape recording machines, and particularly to tape transport devices adapted for use in these types of machines, it being understood that the term "recording machines" is to be construed to include recording, playback, combination recording-playback, or the like devices.

The invention consists in such novel features, construction, arrangements, combinations and improvements of parts as may be shown and described in connection with the apparatus herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

A primary object of this invention is to provide new, efficient and improved mechanical control means for operating a recording machine.

Another object of the invention is to provide simplified cam means for centrally controlling the various functions of a recording machine.

Yet another object of this invention is to provide contrivances for controlling the tape transport of a recording machine by mechanical linkage means.

It is a further object of the invention to provide new, simplified and improved means for a positive, enforced and foolproof operation of a recording machine.

Various further and more specific objects, purposes, features and advantages will clearly appear from the detailed description given below in connection with the accompanying drawings which form part of this specification and illustrates merely by way of example one embodiment of the device of the invention. In the following description and in the claims, parts will be identified to be as generic in their application to similar parts as the art will permit. Like reference characters denote like parts in the several figures of the drawings.

Figure 1:
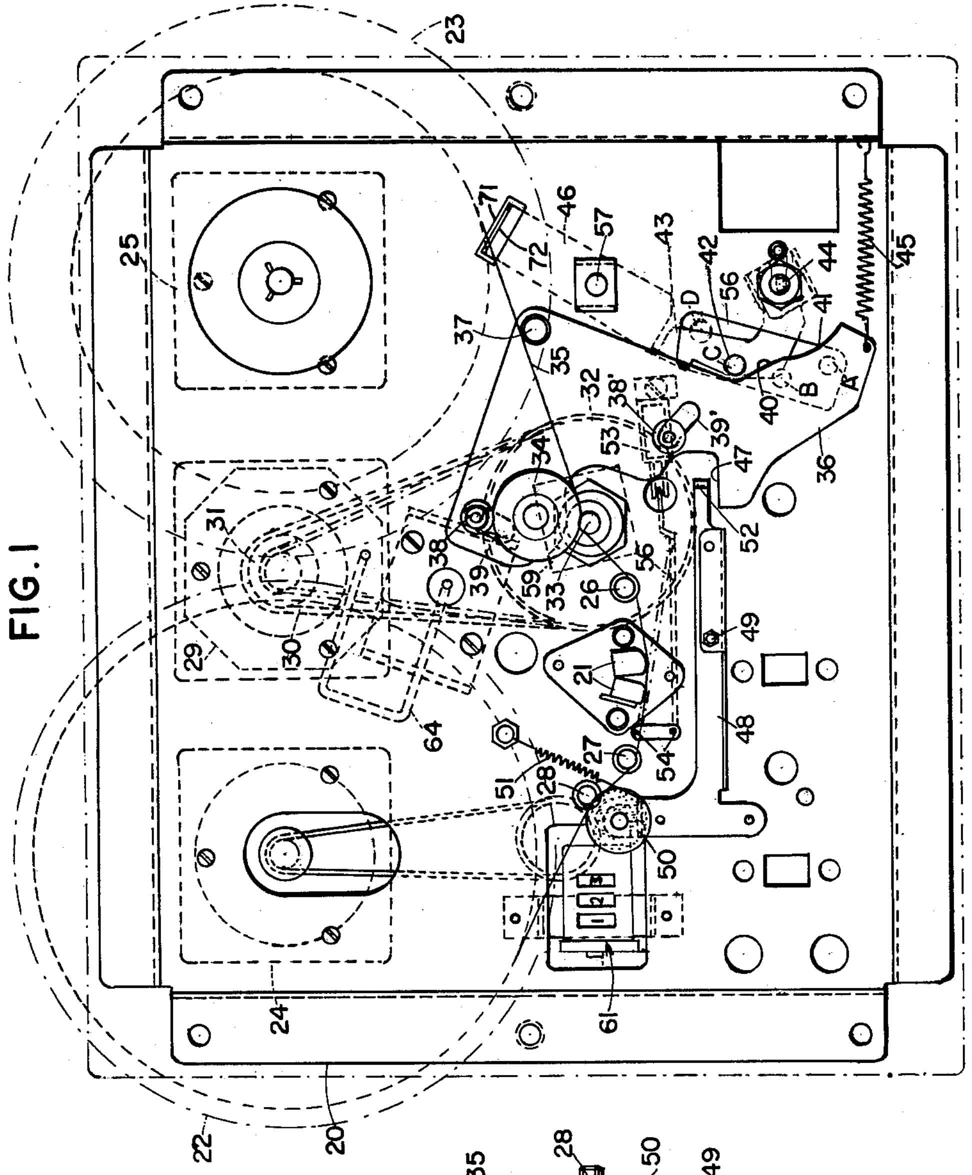
FIG. 1 is a plan view of the mounting plate of a tape recording machine mechanism according to the invention.
Figure 2:
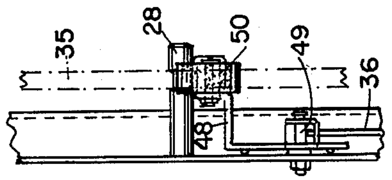
FIG. 2 is a side view of a detail part of the mechanism shown in FIG. 1, partly broken away.

Referring now in more detail to the drawings illustrating a preferred embodiment by which the invention may be realized, there is shown in FIG. 1 (in plan view) the mounting plate of a recording machine, generally indicated by the numeral 20.

Figure 3:
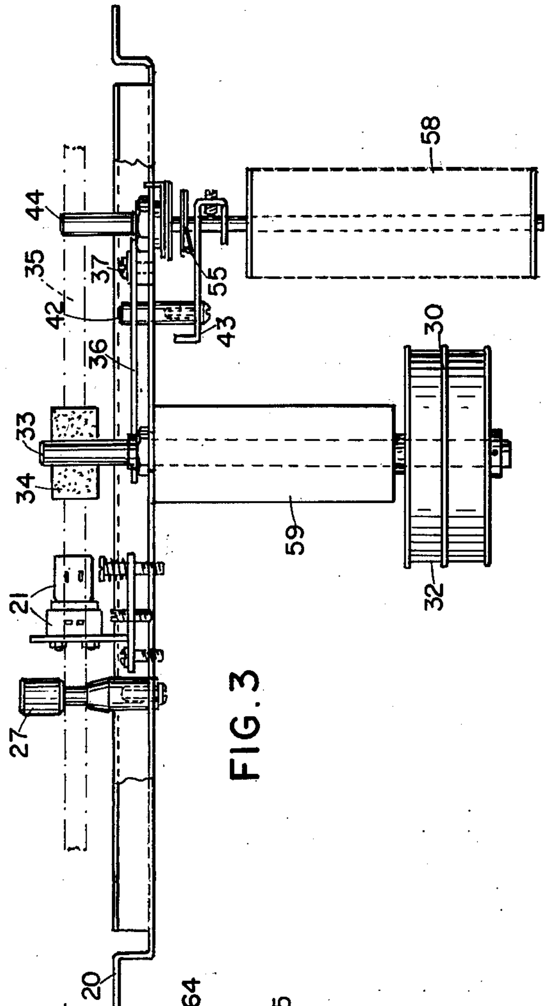
FIG. 3 is a front elevation of the drive arrangement for the magnetic tape.
Figure 4:
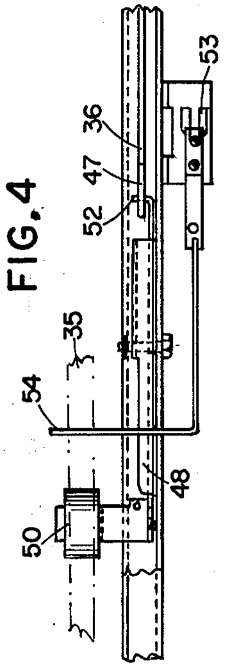
FIG. 4 is a front elevation of the safety switch device of the mechanism shown in FIG. 1, partly broken away.

A combined recording playback and erasing magnetic head 21 is mounted on mounting plate 20. Tape spools 22, 23, driven by electric motors 24, 25, are provided and small guide posts 26, 27 and 28 are arranged for guiding the recording tape from one spool over the magnetic head 21 to the other spool. A third electric motor 29 is arranged for driving, by means of belt 30 and pulleys 31 and 32, a capstan shaft 33, which is journalled in a housing 59 in conventional sleeve bearings (not shown in the drawing). A pinch roller 34 is arranged for operatively engaging the capstan shaft 33, pressing the tape 35 against the capstan shaft 33 when the apparatus is operated as a recording or playback machine. The pinch roller 34 is rotatably mounted on a cam plate 36 which is pivotally mounted on a stud 37. The cam plate 36 is slidingly held by studs 38, 38′, which engage slots 39, 39′ in said cam plate 36 for maintaining a parallel position during the angular movement of cam plate 36. Cam plate 36 has two cam faces 40 and 41 on one end thereof which can be engaged successively by a pin 42 which is fastened to an operating lever 43. The pin 42 projects through an opening 56 in mounting panel 20. The lever 43 is pivotally mounted on a vertical shaft 44 having a detent arrangement 55 (FIG. 3) thereon for holding the lever in its various positions. Also mounted on the shaft 44 is a rotatively combined multiple switching device 58, shown schematically in FIG. 3 in dotted lines, so that the various operations of the machine are electrically controlled together with the positions of operating lever 43. The shaft 44 can be manually rotated so establish the various operating positions. A tension spring 45 is attached to the end of the cam plate 36 for keeping the cam faces 40, 41 of cam plate 36 consistently in operating contact with pin 42 of lever 43. A safety linkage 46 is arranged in the path of lever 43, so that the extreme clockwise position of this lever can only be assumed after the linkage 46 has been moved out of the path of lever 43 by depressing button 57.

Figure 8:
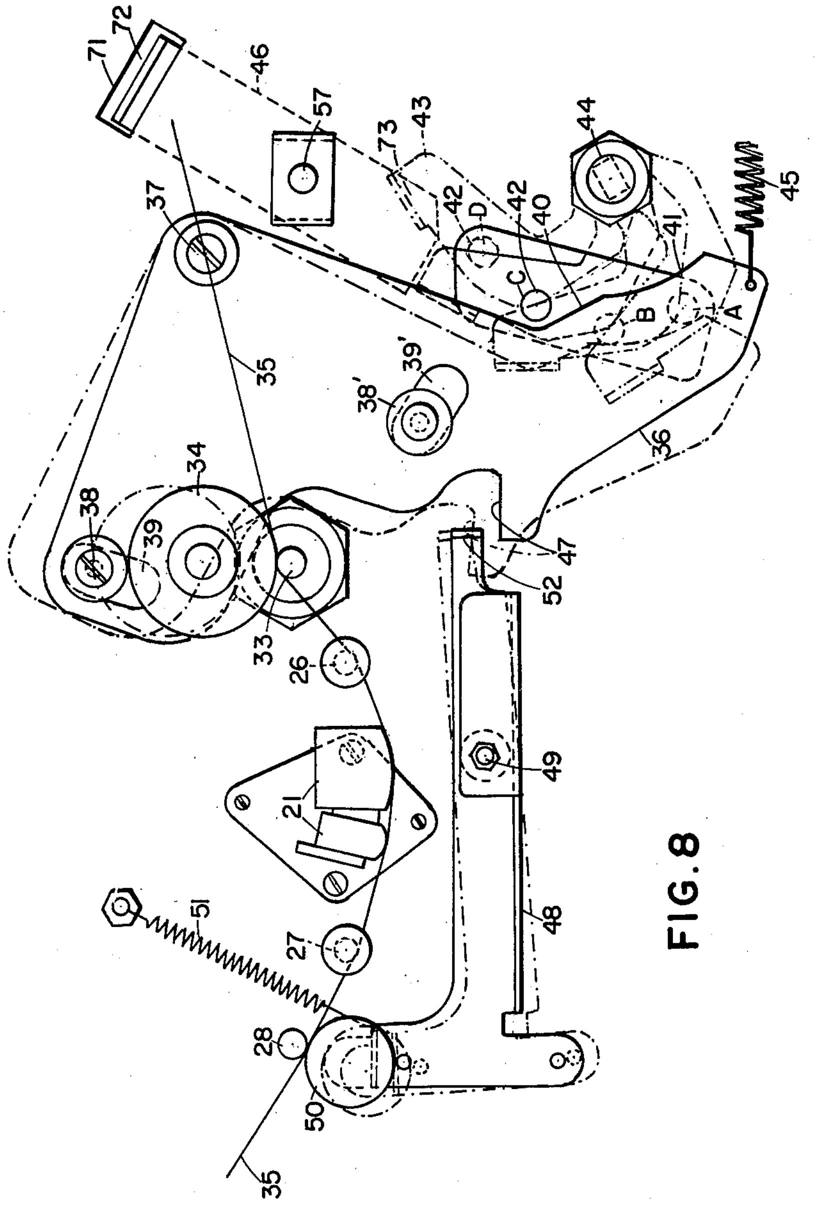
FIG. 8 is a detail view of the cam plate mechanism of the tape recording machine shown in FIG. 1.

The cam plate 36 has a third cam face 47 which is located so that it can operate against the end 52 of lever 48 which is pivotally mounted on stud 49. A felt roller or drag means 50 is mounted on the other end of the lever 48 so that during recording or playback operations of the machine, roller 50 holds the tape 35 tightly against the guide post 28 by means of a tension spring 51 attached to this end of lever 48. Since the felt roller 50 holds the tape 35 against the guide post 28, a consistent and reliable contact of tape 35 against magnetic head 21 is created and a constant tension of the tape between capstan 33 and guide post 28 and felt roller 50 is maintained, when the machine is either used for recording or playing back to obtain a uniform signal. When the cam plate 36 is moved counterclockwise by pin 42 of lever 43 from position C to position B (FIG. 8), the cam face 47 contacts end 52 of lever 48 and moves the felt roller 50 away from tape 35 and guide post 28. In this position the machine is set in its "on" position without tape movement. By moving pin 42 counterclockwise from position B to position A, the machine is set for moving the tape 35 at high speeds, but does not change the geometric location of cam plate 36 and lever 43 as maintained in the "on" position.

A safety switch 53 having a contact arm 54 extending for riding in conatct with the tape 35 is arranged on mounting plate 20. The tension of tape 35 during operation deflects switch 53 into the "on" position, permitting the machine to function properly. When the tension of tape 35 is released due to the complete removal of the tape, switch 53 snaps back to the "off" position, thus cutting off the rotation of the take-up reel 23. Take-up reel 23, released from the tape tension, would otherwise rotate at an uncontrolled higher speed, whipping the free end of the tape 35, causing it to break into small pieces.

Figure 6:
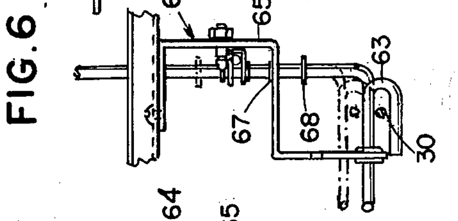
FIG. 6 is a side view of the speed changing device shown in FIG. 5.
Figure 5:
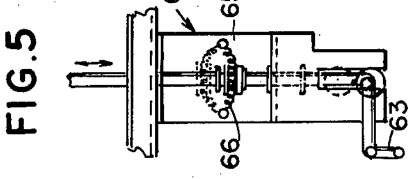
FIG. 5 is a detail view of the speed changing device of the tape recording machine.
Figure 7:
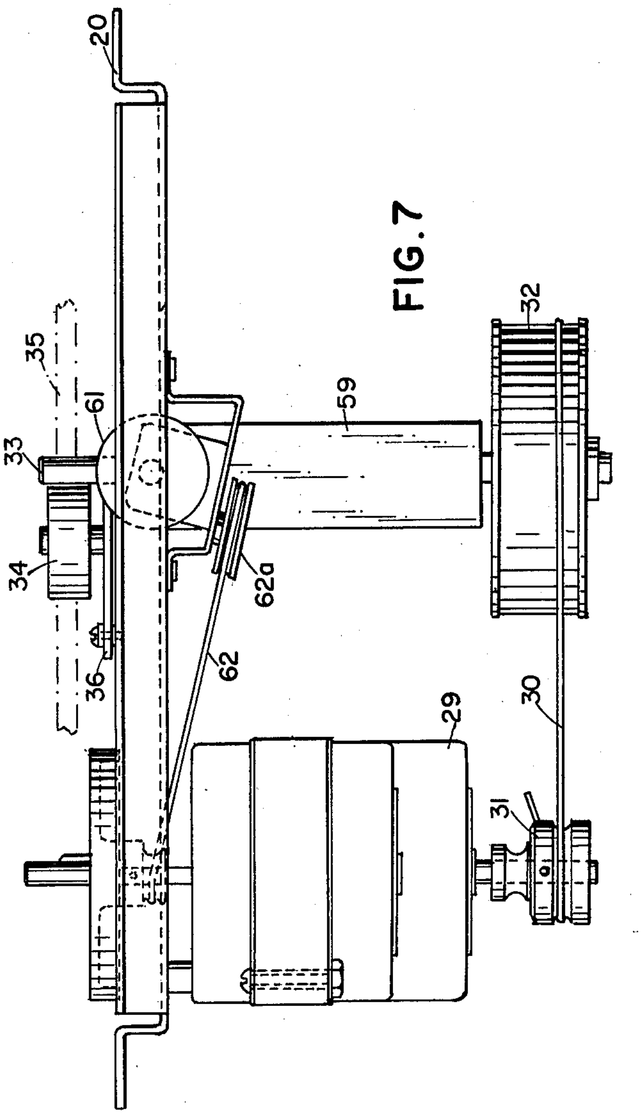
FIG. 7 is a detail view of the drive arrangement for the capstan and the counting device of the tape recording machine.
Figure 9:
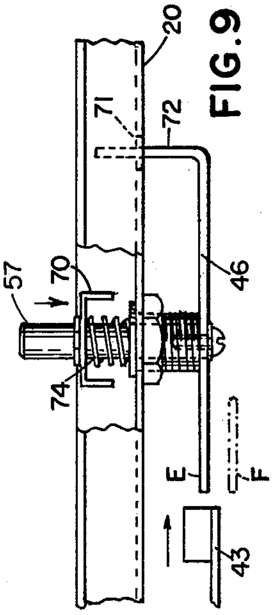
FIG. 9 is a detail side elevation of the safety device for the cam plate mechanism, shown in FIG. 8.

A counter 61, driven by the electric motor 24 by belt 62, trained over pulley 62*a*, is arranged on mounting plate 20. A speed shift device 64, similar to that disclosed in Patent No. 3,037,088, is arranged in connection with the capstan drive as described above. This device (FIGS. 5 and 6) consists of a properly bent rod 63, manually vertically movable in a bracket 65. Belt 30 is guided by rod 63 which is held in its uppermost and lowermost positions by stops 67 and 68, respectively, and by spring 66. Thus, belt 30 can be switched to a corresponding step groove of pulley 31 and is maintained there during the operation. A safety linkage (FIG. 9) prevents unintentional movement of pin 42 to position D. By pushing button 57, the stop 70 will limit the downward movement of linkage 46 to position F so as to clear lever 43 when it is rotated from position C to position D (FIG. 8), while the cutout 71 maintains the angular position of linkage 46 through bend 72. Lever 43 overhangs linkage 46 at 73 (FIG. 8) thereby preventing its upward return. When lever 43 is rotated counterclockwise back from position D to position C, spring 74 expands and returns linkage 46 upwards to position E automatically.

For proper operation, the machine is switched on by means of a main switch (not shown in the drawings), and then the lever 43 is operated to shift cam plate 36 into the following four positions of pin 42 (FIG. 8):

A. Stand-by for winding the tape in either direction at high speed, with drag means 50 and pinch roller 34 out of contact with the tape;

B. "On" position of the machine without tape movement, and without drag means 50 and pinch roller 34 contacting the tape;

C. Playback position of the machine, with drag means 50 and pinch roller 34 contacting the tape and keeping proper tension;

D. Recording position of the machine with drag means 50 and pinch roller 34 contacting the tape and keeping proper tension, and with linkage 46 moved out of the way for the record position.

Thus, the operation of the tape recording machine is reduced to one main control member, in addition to the conventional switches, such as main switch, volume control switch and track control switch (not shown in the drawings), and is simplified to provide a positive performance with a minimum number of mechanical members.

While the invention has been described and illustrated with respect to a certain particular preferred example which gives satisfactory results, it will be understood by those skilled in the art after understanding the principle of the invention, that various other changes and modifications may be made without departing from the spirit and scope of the invention, and it is intended therefore in the appended claims to cover all such changes and modifications.

We claim:

1. In a magnetic tape recording machine having magnetic tape spooling means, at least one magnetic head, magnetic tape adapted to travel in intimate association with said head, a capstan arranged in the path of said tape, drive means for said capstan, and tape guiding means arranged in said path of said tape in proximity of said head; a pinch roller operatively engaging said tape and said capstan for frictionally driving said tape, a pivotally mounted cam plate having said pinch roller rotatably mounted thereon, drag means operatively engaging said tape and said tape guiding means, said drag means frictionally maintaining said tape under uniform tension, a pivotally mounted lever having said drag means rotatably mounted thereon, spring means on both said cam plate and on said lever, said spring means keeping said pinch roller and said drag means in contact with said tape, a plurality of cam faces on said cam plate, one of said cam faces engaging said pivotally mounted lever, and angularly displaceable means contacting at least one of said plurality of cam faces on said cam plate for moving said pinch roller and said drag means out of frictional engagement with said tape against said spring means.

2. In a magnetic tape recording machine having magnetic tape spooling means, at least one magnetic head, magnetic tape adapted to travel in intimate association with said head, a capstan arranged in the path of said tape, drive means for said capstan, and tape guiding means arranged in said path of said tape in proximity of said head; a pinch roller operatively engaging said tape and said capstan for frictionally driving said tape, a pivotally mounted cam plate having said pinch roller rotatably mounted thereon, drag means operatively engaging said tape and said guiding means, said drag means frictionally maintaining said tape under uniform tension, a pivotally mounted lever having said drag means rotatably mounted thereon, spring means on both said cam plate and on said lever, said spring means keeping said first pinch roller and said drag means in close contact with said tape, a plurality of cam faces on said cam plate, one of said cam faces engaging said pivotally mounted lever, angularly displaceable means contacting at least one of said plurality of cam faces on said cam plate for moving said pinch roller and said drag means out of frictional engagement with said tape, and linkage means for holding said angularly displaceable means in a preferred extreme position.

3. In a magnetic tape recording machine having magnetic tape spooling means, at least one magnetic head, magnetic tape adapted to travel in intimate association with said head, a capstan arranged in the path of said tape, drive means for said capstan, and tape guiding means arranged in said path of said tape in proximity of said head; movable cam means having a pinch roller mounted thereon, said pinch roller engaging said tape and said capstan, pivotally arranged means having drag means mounted thereon, said drag means frictionally engaging said tape and said guiding means, said movable cam means having means engaging said pivotally arranged means, power means attached to both said movable cam means and to said pivotally arranged means, said power means for holding both said pinch roller under pressure against said capstan and said drag means under pressure against said guiding means, angularly displaceable means contacting said movable cam means for moving said movable cam means to various positions, and linkage means arranged to hold said angularly displaceable means in a preferred position.

4. In a magnetic tape recording machine according to claim 3, and having at least a two-speed driving means for said capstan, and manually operated speed shifting means.

5. In a magnetic tape recording machine having magnetic tape spooling means, means for rotating said tape spooling means, at least one magnetic head, magnetic tape adapted to travel in intimate association with said head, a capstan arranged in the path of said tape, drive means for said capstan, and tape guiding means arranged in said path of said tape in proximity of said head; a pinch roller operatively engaging said tape and said capstan for frictionally driving said tape, a movably mounted cam having said pinch roller rotatably mounted thereon, drag means operatively engaging said tape and said tape guiding means, said drag means frictionally maintaining said tape under uniform tension, a lever having said drag means mounted thereon, spring means on both said cam and on said lever, said spring means keeping said pinch roller and said drag means in contact with said tape, a plurality of cam faces on said cam, one of said cam faces engaging said lever, and a displaceable means contacting at least one of said plurality of cam faces on said cam for moving said pinch roller and said drag means out of frictional engagement with said tape against said spring means.

6. In a magnetic tape recording machine according to claim 5, and having at least a two-speed driving means for said capstan, and manually operated speed shifting means.

7. In a magnetic tape recording machine according to claim 3, and having manually operated means for shifting said angularly displaceable means.

8. In a magnetic tape recording machine according to claim 5, and having at least a two-speed driving means for said capstan, manually operated speed shifting means, taps counting means, said counting means comprising means for being driven by said spooling means and having manually operated means for shifting said angularly displaceable means.

References Cited in the file of this patent

UNITED STATES PATENTS

| | | |
|---|---|---|
| 3,002,671 | Brumbaugh et al. | Oct. 3, 1961 |
| 3,026,057 | Horimura | Mar. 20, 1962 |